Figure 1:
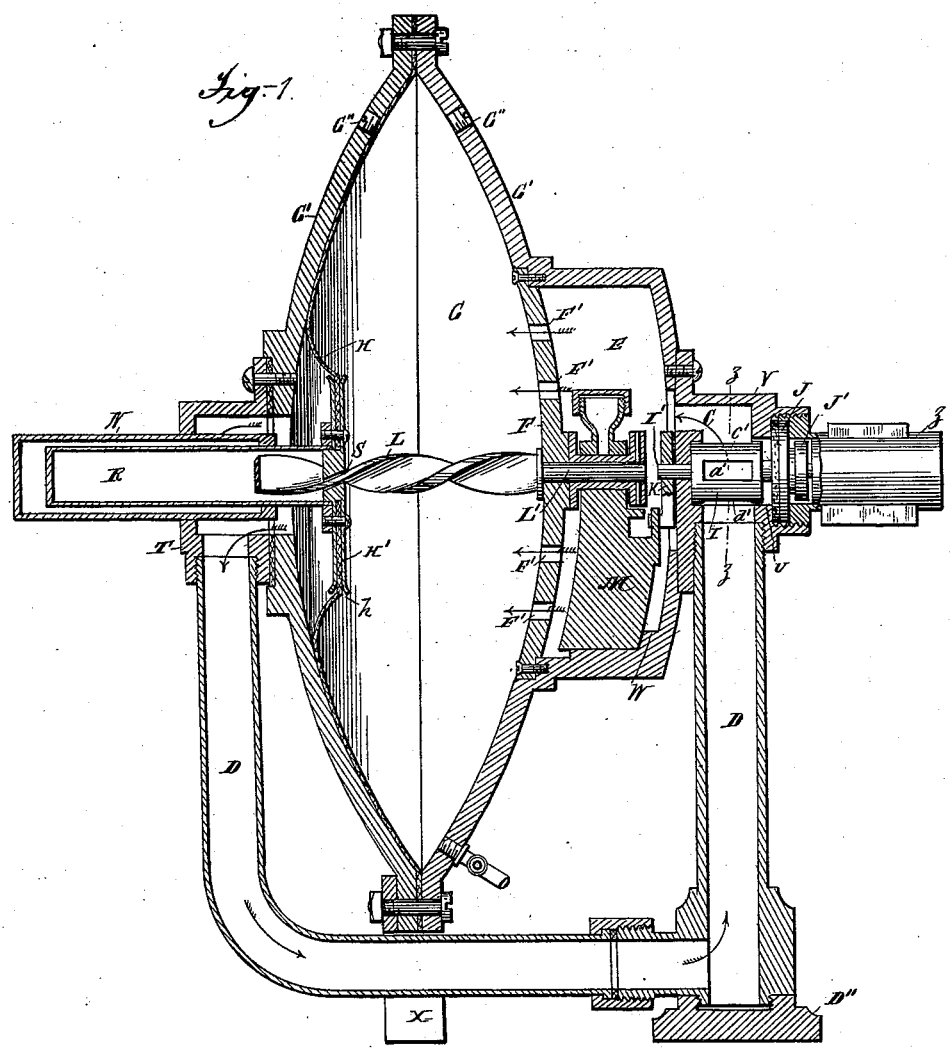

(No Model.) 3 Sheets—Sheet 1.

W. J. GURD.
FLUID AND GAS METER.

No. 540,658. Patented June 11, 1895.

Attest:
Geo. H. Potts.
Chas. F. Dane

Inventor:
William J. Gurd
by Jno. J. Dame Atty (No Model.) 3 Sheets—Sheet 2.
W. J. GURD.
FLUID AND GAS METER.
No. 540,658. Patented June 11, 1895.
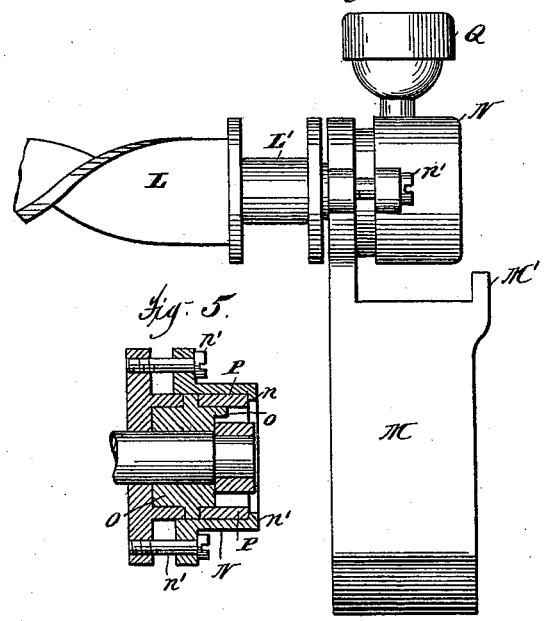
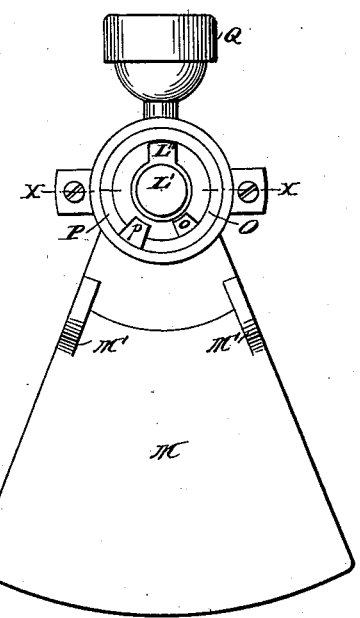
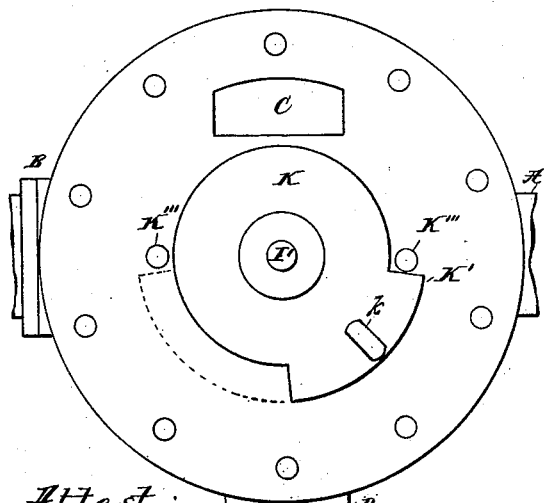
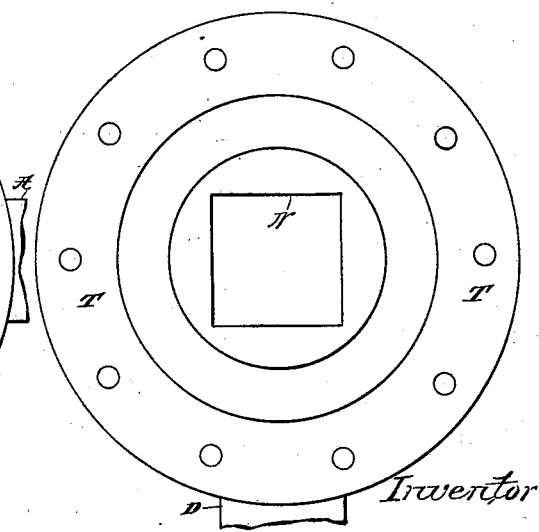
Attest:
Geo. H. Botts.
Chas. F. Dane.
Inventor
William J. Gurd
by J. R. Rome, atty.

(No Model.) 3 Sheets—Sheet 3.

W. J. GURD.
FLUID AND GAS METER.

No. 540,658. Patented June 11, 1895.

UNITED STATES PATENT OFFICE.

WILLIAM J. GURD, OF SARNIA, CANADA.

FLUID AND GAS METER.

SPECIFICATION forming part of Letters Patent No. 540,658, dated June 11, 1895.

Application filed December 5, 1888. Serial No. 292,712. (No model.)

*To all whom it may concern:*

Be it known that I, WILLIAM J. GURD, a citizen of the Dominion of Canada, and a resident of the town of Sarnia, in the county of Lambton and Province of Ontario, Canada, have invented new and useful Improvements in Meters for Measuring and Registering Fluids, Gases, &c., of which the following, taken in connection with the drawings accompanying, is a specification.

My invention relates to that class of measuring and registering apparatus, having for its object the measuring of fluids, gases, and other similar purposes; and it consists of a hollow receptacle provided with suitable channel ways, through which matter to be measured and registered is passed into, and out of said chamber, the supply measuring, registering, and discharge being regulated by means of a flexible diaphragm, actuating shafts operated by said diaphragm and a regulating valve, substantially as will hereinafter be described, and as clearly shown in the drawings, which will serve to enable others skilled in the art, to make and practice my said invention, as it clearly illustrates one of the practical modes of constructing and operating my invention although obviously capable of many modifications in form and arrangement of parts, without departing from the spirit of my invention.

The object of my present invention, is to simplify and lessen the number of parts heretofore used in contrivances for a similar purpose, and to insure a positive and correct measure of the matter, passing through it with little or no liability to get out of proper working order.

Figure 2:
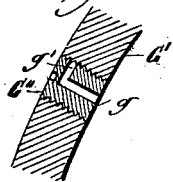
Figure 8:
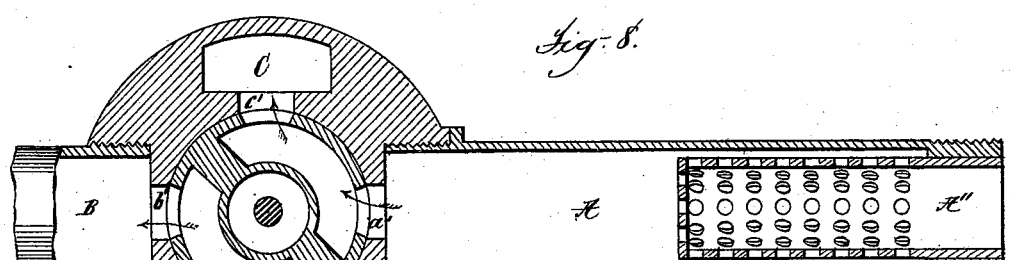
Figure 11:
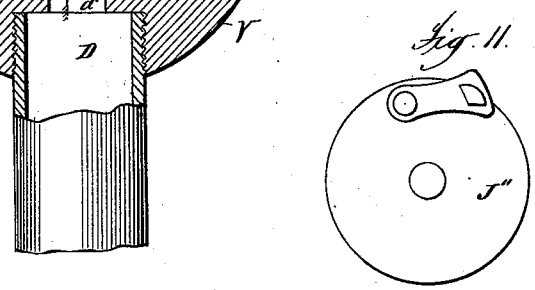
Figure 10:
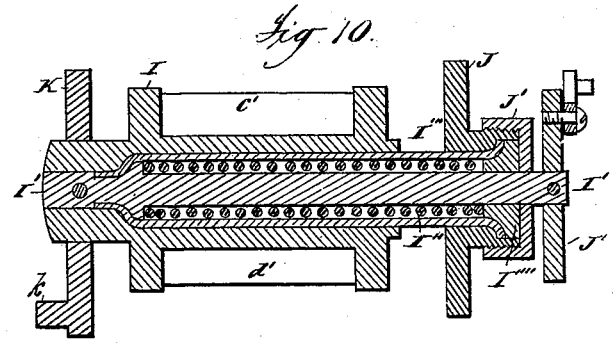
Figure 9:
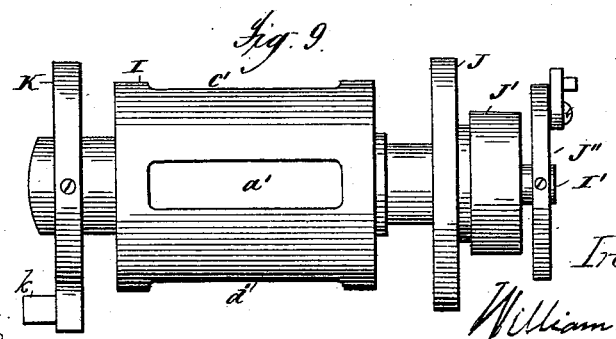

Referring to the drawings, Figure 1 represents a vertical sectional view through the center of my improved meter and a side view of the valve and the index or registering device located at one side thereof. Fig. 2 represents an enlarged broken section of the shell or case forming the meter or main receiving-chamber, containing the air-vent in section. Fig. 3 represents an edge view of the tripping device supported on its bearing. Fig 4 represents a front or face view of the same. Fig. 5 is a sectional view through line *x x* of Fig. 4, showing the construction of the adjusting device. Fig. 6 represents an end view of the valve-seat, showing passages leading from the same and the disk located at the end of the central rod or shaft which passes through the valve proper. Fig. 7 represents a front view of the seat or support containing the bearing in which the tube projecting from the diaphragm reciprocates detached from the shell or case G'. Fig. 8 represents a sectional view of the valve and valve-seat through line *z z*, Fig. 1, also showing the filter in the induction-pipe. Fig 9 represents a face view of the valve and disks or plates located on its central shaft at either end of the same. Fig 10 represents a vertical sectional view through the center of the same longitudinally. Fig. 11 represents a detached view of the actuating-plate located at the end of the central shaft of the valve.

In the drawings, A, represents the induction pipe or passage for the admission of fluids or other matter, into the chamber represented at G. The fluid enters the said chamber through the valve ports *a'*, *c'*, *d'*, in the valve I (see Figs. 1 and 8) into the valve chamber E, through the opening C, thence into the chamber G, through the openings or perforations F', or through the passage D into the opposite side of the chamber G, according to the position of the valve ports in relation to the induction pipe A, as will be described more fully hereinafter.

B, is the eduction or outlet passage for the discharge of the fluid or other matter.

The said chamber G, is formed of two concave circular plates or disks G', G', which when secured together form a shell or case. In the upper parts of said shell or case and upon opposite sides thereof, are two air-vents or openings G'', G'', through which the air in the chamber G is exhausted. Said air-vents or openings may be closed by screws, plugs or other suitable means. In the present instance, however, a screw (*g*) is used, having a hollow center communicating with the outer surface near its head thereof, as shown at (*g*) in Fig. 2. By this means the screw may be slightly turned or withdrawn sufficiently to bring the opening (*g'*) beyond the outer surface of the shell or case to allow the air to pass out through the passage in said screw without necessitating the entire withdrawal of the screw from the opening in said shell or case. The said chamber is also provided at or near its base in one or both sides thereof, with waste-cocks as clearly shown in Fig. 1, through which any sediment or other material that might accumulate therein, may be drawn off.

H, represents a flexible diaphragm of suitable material, secured at suitable points within and in the present instance held by and between the edges or outer periphery of the plates or disks G′, G′, as shown in Fig. 1, and H′ represents a plate or plates of a rigid substance, in the present instance consisting of two metallic plates beveled or rounded on their inner peripheries as shown at h in Fig. 1, in order to prevent the diaphragm from being cut or otherwise injured by its contact with the edges of said disks; said disks embracing the central part of the said flexible diaphragm, to which is rigidly attached a hollow square tube (R) closed at its outer end, projecting horizontally therefrom, adapted for the reception of the free end of a helical device L, which passes into the same through a counter-part opening S in the plates H′, for the purpose to be described hereinafter. The said square tube R, has its seat or bearing in a counter-part N, in which it operates when reciprocated by the action of the diaphragm H, when forced back and forth in the said chamber G, by the action of the water.

Upon one side of the shell or case G′ is formed a secondary, or valve chamber E, in which a tripping device M operates, provided on its lower surface with a stud W adapted to limit the movement of the said tripping device.

F, represents the wall between the chambers G and E, provided with perforations F′ therein, to admit of the flow of fluid to or from the chamber G.

I represents a circular valve provided with four openings or ports a′, b′, c′, d′, therein, separated by a longitudinal wall or division extending through the center, said valve forming two passages as more clearly shown in Fig. 8.

V represents the valve seat provided with four openings corresponding with the ports in valve I. (See Fig. 8.) Said valve seat is secured to the outer wall of the valve chamber E, by screws or other suitable means as shown in Fig. 1.

I′ represents a rod or shaft extending through the center of the valve I and secured to and adapted to move with the same (see Figs. 8 and 10) provided on its inner end, or that end adjacent to the chamber E, with a circular plate or disk K, rigidly attached thereto, (see Figs. 1, 6 and 10) provided with a projecting section K′, adapted to operate between two pins K‴ located on the valve seat at opposite sides of the said disk K, and is of sufficient width to allow the disk K to turn a distance equal to the distance between the said valve ports.

k, is a projection or pin on said disk, against which the arms or projections M′, located at the opposite edges of the tripping device M, as shown in Figs. 1, 3 and 4 alternately contact, to operate the valve, I, that is, to alternately form a continuous passage, first, between the induction or supply passage A and passage C (see Fig. 8) and then between said induction or supply passage A and passage D, to alternately cause the flow and discharge of the fluid to and from opposite sides of the receiving chamber G. It is obvious, however, that the said arms or projections M′, on said tripping device may be dispensed with and the tripping device proper engage the projection k, on said disk.

L, represents a helical device, serving as a means for moving the valve, extending horizontally across the chamber G its free end extending through a counterpart opening in the plate H′ into the hollow tube R, as before described, and at its opposite end is provided with an extension extending through an opening in the side of the chamber G which forms a bearing for the same, into the chamber E, forming a bearing on which the weight or tripping device M is supported. A projection L″ is formed at the end of the said bearing L′ on its outer circumference as shown in Fig. 4, adapted to alternately engage two lips or projections o, p, of two rings O and P, rigidly secured to the hub of tripping device M, as will be explained hereinafter, to raise the said trip up when the bearing or axle L′ is turned by the action of the chamber G, upon the helical device or propeller L, beyond its center of gravity, when the same falls to the opposite side of the chamber, one of the projections M′, thereon coming in contact with and carrying forward the projection k, thus operating the valve, I, and the index, as will hereinafter be described.

Q, represents an oil-cup, located on top of the tripping device M, and has communication with the axle or bearing L′ for lubricating the same.

The said ring O is located upon a hub of the trip M, and is provided with a lip or projection o, on its inner circumference, as hereinbefore referred to, and a shoulder upon its side (as shown in Fig. 5) upon which rests the ring P, also provided with a lip or projection p. (See Fig. 4.) A collar N, provided with a shoulder n, on its inner side to engage the collar P, is adapted to be secured to the said hub of the trip M, by screws n′, n′, to clamp the said rings when the lips or projections on the same are adjusted to the desired position and hold the same in a fixed position relatively to the trip M, to be acted upon by the projection L″, of the axle or bearing L′. By loosening the set-screws n′, n′, thus relieving the pressure upon said rings, the latter may be turned to adjust the position of the lips or projections o, p, thereon, in relation to the projection L″ on the axle L′ by which means the measuring capacity of the meter may be regulated, according to the throw of the trip M, which operates the valve and index.

To prevent any water communicating with the index and its mechanism from the valve I, a water-tight wall is interposed between the same, consisting of a stationary plate or disk J, through the center of which one end of the rod or shaft I' passes, adapted to be pressed against a shoulder $v$ in the valve seat, between which packing of any suitable material may be inserted, by the end of the shell of the index which is adapted to be screwed within the end of the valve-seat in contact with said plate J as clearly shown in Fig. 1.

To form a tight joint between the rod or shaft I' and the wall J, where the rod passes through the latter and yet allows the said rod to move with the valve, I provide a covering of flexible material for the said rod or shaft consisting, in this instance, of rubber tubing I''', secured at one end between the shoulder of a collar or packing ring I'''' located on the shaft I', and the shoulder of a projecting flange of the collar or disk J, between which it is clamped by a packing nut J'. The opposite end of said flexible tube or covering is clamped between a shoulder of the rod or shaft I', and a corresponding shoulder in the valve as clearly shown in Fig. 10. Between the said flexible tube or covering I''' and the rod or shaft I' is interposed a sleeve of coiled wire I'' surrounding said rod or shaft and loosely located thereon. It is obvious, however, that reed, cane, or other suitable material might be used in lieu of said wire, but I consider the wire preferable for obvious reasons. The object of the combination of said coiled wire with the flexible tube or covering is to form an absolutely tight joint between the valve, and the index, and at the same time allow the shaft to move or turn with the least possible friction. The flexible tube or covering secured at its opposite ends as described simply turns in accordance with the movement or turning of the valve, and the coiled spring lying between the shaft and insures a perfectly uniform movement or turning throughout the whole length of the said tube or covering. The said shaft I' is provided on its free end with the index actuating plate J'' rigidly secured thereto. Said index actuating plate being mounted on the valve actuating shaft I', operates or moves with the said valve and operates the index or registering device consisting, in this instance, of circular disks provided with numerals on their outer peripheries adapted to indicate and register the quantity of fluid or other matter which passes through the meter.

The passage D, formed in this instance of piping, leads from the valve I, into the opposite side of the chamber G, as shown in Fig. 1, the pipe being joined to a projection T, on the shell or case G', which opens into the chamber G, as clearly shown in Fig. 1. To prevent any undue accumulation of dirt or other foreign material in the passage D, the same is closed at its lowest point by means of a nut D'', as clearly shown in Fig. 1, which may be removed when desired. The same also forms a foot, which in combination with the feet $x$, secured to the lower part of the shell or case G' form the support for the meter to rest upon. In the induction pipe A, I have in this instance inserted a shell A'', slightly smaller in diameter than the said pipe to leave a space between the same, provided with perforations therein, both in its sides and end, to allow the water to pass freely through the same, and prevent any foreign matter from entering the meter and impeding its free operation.

The operation of my meter is as follows:— The water or other matter to be passed through the meter for measurement or registration, or both, is admitted through the passage A, into the valve port ($a'$) through the port ($c'$) (see Figs. 1 and 8) and is thence deflected through the opening C in the direction of the arrows, as indicated, into the valve chamber E, and from thence through openings or perforations F' in the wall F, into the receiving chamber G, forcing the diaphragm toward the opposite side of the chamber G, or in the position shown in Fig. 1, thus discharging the water in the chamber upon that side of the diaphragm out through the passage D, in the direction of the arrows through the valve port $d'$, through port $b'$, into the discharge or outlet pipe B. The said diaphragm H, when being forced across the chamber G, as described, operates upon the helical device L, in a manner to lift the tripping device M beyond its perpendicular, and the same falls upon the opposite side, one of the projections M' formed thereon contacting with the pin or projection $k$ on the disk K carrying the same forward one quarter turn as hereinbefore described, which is sufficient to change the position of the ports in the valve I, in relation to the induction pipes and passages D, and C, to that shown in Fig. 8 (and at the same time operates the index or registering device) causing the water on entering to pass through the pipe D, into the opposite side of the chamber G, forcing the diaphragm back, and discharge the water in that part of the chamber through the openings F' into the chamber E, through opening C, into valve port $c'$, and is thence deflected through port $b'$, into the discharge pipe B, thus altering to opposite sides the filling and emptying of the receiving chamber G, by altering the position of the valve ports in relation to the induction pipe, the index being operated by a disk located on the end of the shaft passing through said valve (I) as hereinbefore referred to.

Having thus set forth my invention, what I claim as new, and desire to secure by Letters Patent of the United States, is—

1. The combination in a registering meter provided with a chamber and a flexible diaphragm, the periphery of which is held about central between the walls thereof, and a centrally located stem connecting with the center of said diaphragm, of a helical blade operated by the inflow of fluid against said diaphragm, substantially as and for the purpose set forth.

2. The combination in a registering meter provided with a main receiving chamber, a flexible diaphragm held rigid at its periphery forming a partition therein, and a tube attached to and moved by said diaphragm, of a helical blade and tripping device, substantially as and for the purpose set forth.

3. In a registering meter provided with a main receiving chamber with a flexible diaphragm held by its periphery forming a partition therein, of a tripping device provided with a helical blade operated by a counter-part carried by said diaphragm, and valve, substantially as described and for the purpose set forth.

4. In a registering meter provided with a flexible diaphragm, a vibrating tube or stem operated by said diaphragm, a tripping device provided with a helical blade, operated by said vibrating tube, of a valve adapted to open and close the ports for the admission of fluids, &c., and operate a registering or tallying apparatus, substantially as and for the purpose set forth.

5. In a registering meter, the combination with a chamber and ports located therein, substantially as set forth, of a flexible diaphragm provided with a reinforced or rigid center having secured thereto a hollow square tube, adapted to operate a tripping device and valve, substantially as described and for the purpose set forth.

6. The combination in a registering meter, with a meter-chamber, a secondary or valve chamber so-called, located at one side of the former, and having communication therewith, a flexible diaphragm supported by and forming a partition between the opposite walls of said meter chamber, a helical blade, extending horizontally across the center of the meter-chamber provided with an extension projecting into the valve chamber, a tripping device supported thereon, of a valve having communication with the induction and discharge pipes, adapted to be operated by said tripping device to automatically change or vary the supply and discharge of the contents entering to and from opposite sides of said meter chamber, substantially as described and for the purpose set forth.

7. In a registering meter, the combination with a meter-chamber, a flexible diaphragm supported by the same, substantially as set forth, a helical blade provided with an extension at one end thereof forming a bearing, a tripping device supported on said bearing, of an adjustable device for regulating the throw of said tripping device consisting of two rings, substantially as described located on the hub of said trip, provided with lips or projections on their inner sides, adapted to be held in a fixed position relatively to each other, to be engaged by a projection on said bearing, by a clamping collar, substantially as described and for the purpose set forth.

8. In a registering meter, the combination with a meter-chamber, a flexible diaphragm, a valve chamber, an abutment located therein, a helical blade engaged and operated by said flexible diaphragm, provided with an extension having a projection at one end thereon, a tripping device supported on said extension and operated by the said projection thereon, substantially as described and for the purpose set forth.

9. In a registering meter the combination with a meter chamber, a flexible diaphragm, a helical blade, provided with an extension, a tripping device supported on said extension provided with a projection or projections thereon, of a valve provided with an extension, a disk rigidly secured on said extension, provided with a projection adapted to be engaged by said tripping device, substantially as described and for the purpose set forth.

10. A registering meter, provided with a main chamber, partitioned by a flexible diaphragm, with a receiving and discharging channel-way, connecting and passing through the outer walls thereof, and a supplemental chamber inclosing a tripping device operated by said flexible diaphragm, through the medium of a helical blade and a supply and discharge valve operated by said tripping device, substantially as described.

11. In a registering and measuring apparatus, the combination with a reciprocating shaft and a helical blade or shaft, adapted to partially revolve and operate a valve, of a registering or tallying device, by which the fluid or other material measured is registered, substantially as set forth.

12. In a registering and measuring apparatus, the combination with a reciprocating shaft, and a helical blade or shaft adapted to partially rotate, a channel-way uniting said chambers at opposite points, about central thereof, of a four-way valve arranged to be operated by said propeller or screw shaft, substantially as described.

13. In a registering and measuring apparatus, provided with two chambers, located side by side, a regulating mechanism, consisting of a flexible diaphragm, a tripping device operated by said diaphragm and a valve operated by said tripping device, of a registering device, driven by an extension or stem part of the said valve, substantially as described and for the purpose set forth.

14. In a measuring apparatus, provided with partitioned chambers connecting channel ways, and actuating shafts, of a regulating valve, provided with an actuating shaft through the center thereof, a flexible packing consisting of a metallic coil and an elastic covering, interposed between the outer periphery of said shaft, and casement of said valve, substantially as described and for the purpose set forth.

15. In a measuring apparatus provided with partitioned chambers, connecting channel ways, and actuating shafts, of a regulating valve, provided with an actuating shaft through the center thereof, surrounded with a coiled wire and flexible packing, interposed between the outer periphery of said shaft and casement, of said valve, substantially as and for the purpose described.

16. The combination in a measuring and registering apparatus, with a receiving chamber, partitioned by a flexible diaphragm, a tube carried by said diaphragm, and a helical blade and tripping device operated by said tube as a medium for operating the moving parts of said apparatus, of a weighted counterpiece and valve, substantially as and for the purpose set forth.

17. The combination with a measuring and registering apparatus, provided with a double chamber, and flexible partition, an induction and discharge passage, with a filter connection, and a registering mechanism, of an actuating mechanism, consisting of a reciprocating shaft, and a helical blade or shaft actuated by said flexible partition, substantially as and for the purposes described.

18. In a measuring and registering meter, the combination with the chambers, diaphragm and connecting operating mechanism, consisting of a reciprocating shaft and a helical blade and valve provided with stops thereon, of a disk or projection, connected to said valve, adapted to engage said stops to limit the throw thereof, substantially as described and for the purpose set forth.

WILLIAM J. GURD.

Witnesses:
JOS. M. CRANE,
CHAS. F. DANE.